(12) United States Patent
Alcheikh et al.

(10) Patent No.: US 11,703,406 B2
(45) Date of Patent: Jul. 18, 2023

(54) WIDE RANGE HIGHLY SENSITIVE PRESSURE SENSOR BASED ON HEATED MICROMACHINED ARCH BEAM

(71) Applicant: KING ABDULLAH UNIVERSITY OF SCIENCE AND TECHNOLOGY, Thuwal (SA)

(72) Inventors: Nouha Alcheikh, Thuwal (SA); Amal Hajjaj, Thuwal (SA); Mohammad Ibrahim Younis, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 154 days.

(21) Appl. No.: 17/441,941

(22) PCT Filed: Apr. 15, 2020

(86) PCT No.: PCT/IB2020/053571
§ 371 (c)(1),
(2) Date: Sep. 22, 2021

(87) PCT Pub. No.: WO2020/212878
PCT Pub. Date: Oct. 22, 2020

(65) Prior Publication Data
US 2022/0163418 A1 May 26, 2022

Related U.S. Application Data

(60) Provisional application No. 62/835,757, filed on Apr. 18, 2019.

(51) Int. Cl.
*G01L 21/22* (2006.01)
*G01L 9/00* (2006.01)

(52) U.S. Cl.
CPC .......... *G01L 9/0019* (2013.01); *G01L 21/22* (2013.01); *G01L 9/0008* (2013.01)

(58) Field of Classification Search
CPC . G01L 19/147; G01L 9/0072; G01L 19/0645; G01L 19/0084; G01L 13/025;
(Continued)

(56) References Cited

U.S. PATENT DOCUMENTS

| 11,274,983 B2 * | 3/2022 | Hajjaj .................. G01L 21/22 |
| 2008/0011091 A1 | 1/2008 | Weldon |

(Continued)

FOREIGN PATENT DOCUMENTS

| CN | 107976274 A | * | 5/2018 | |
| EP | 1376088 A2 | * | 1/2004 | .......... G01L 9/0019 |

(Continued)

OTHER PUBLICATIONS

International Search Report in corresponding/related International Application No. PCT/IB2020/053571, dated Jul. 3, 2020.

(Continued)

*Primary Examiner* — Andre J Allen
(74) *Attorney, Agent, or Firm* — Patent Portfolio Builders, PLLC

(57) ABSTRACT

A device for measuring pressure includes a curved microbeam having opposing ends, a length extending between the pair of opposing ends, and a plurality of resonant frequencies, an actuating electrode extending along the length of the curved microbeam and spaced from the curved microbeam, an AC power source in communication with one of the opposing ends and the actuating electrode to deliver an AC (Continued)

signal at a first symmetric resonant frequency and a second symmetric resonant frequency selected from the plurality of resonant frequencies to the curved microbeam, a DC power source in communication with the opposing ends to pass an electrothermal voltage along a length of the curved microbeam, and a frequency monitoring device to monitor changes in the first symmetric resonant frequency and the second symmetric resonant frequency caused by an ambient pressure surrounding the curved microbeam.

20 Claims, 11 Drawing Sheets

(58) Field of Classification Search
CPC . G01L 19/007; G01L 9/0042; G01L 19/0038; G01L 9/0073; G01L 9/0075; G01L 9/0054; G01L 9/0055; G01L 19/04; G01L 7/00; G01L 7/04; G01L 19/148; G01L 19/143; G01L 19/14; G01L 17/00; G01L 7/18; G01L 15/00; G01L 19/0092; G01L 9/0051; G01L 7/041; G01L 9/065; G01L 9/12; G01L 19/0618; G01L 9/0052; G01L 7/16; G01L 9/125; G01L 19/0609; G01L 9/007; G01L 19/003; G01L 19/0627; G01L 9/0022; G01L 19/0046; G01L 7/084; G01L 9/06; G01L 19/0636; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 23/18; G01L 23/10; G01L 19/0672; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 9/16; G01L 11/00; G01L 27/007; G01L 27/002; G01L 9/0026; G01L 19/00; G01L 9/0089; G01L 9/045; G01L 9/14; G01L 11/025; G01L 1/2281; G01L 11/008; G01L 19/0654; G01L 7/22; G01L 9/0047; G01L 13/026; G01L 9/0076; G01L 9/0025; G01L 9/0035; G01L 13/00; G01L 19/0061; G01L 9/0005; G01L 9/10; G01L 9/0019; G01L 9/08; G01L 11/006; G01L 21/00; G01L 7/08; G01L 9/04; G01L 9/0041; G01L 9/0008; G01L 11/004; G01L 9/0057; G01L 19/086; G01L 1/18; G01L 19/083; G01L 19/069; G01L 19/10; G01L 19/16; G01L 13/023; G01L 7/048; G01L 9/0016; G01L 9/0027; G01L 9/0086; G01L 9/00; G01L 9/0079; G01L 11/04; G01L 9/0048; G01L 9/0091; G01L 19/06; G01L 23/24; G01L 7/182; G01L 1/20; G01L 11/002; G01L 19/0063; G01L 7/166; G01L 23/22; G01L 27/00; G01L 9/0036; G01L 1/02; G01L 9/0061; G01L 9/0039; G01L 23/125; G01L 9/0013; G01L 9/0092; G01L 21/04; G01L 7/104; G01L 9/0045; G01L 19/145; G01L 9/0033; G01L 9/0083; G01L 9/0098; G01L 1/142; G01L 7/24; G01L 1/2293; G01L 9/0029; G01L 9/02; G01L 21/22; G01L 7/022; G01L 9/0064; G01L 23/08; G01L 23/16; G01L 1/205; G01L 5/14; G01L 7/088; G01L 7/163; G01L 9/0007; G01L 23/222; G01L 9/0085; G01L 1/16; G01L 1/2212; G01L 1/2287; G01L 13/06; G01L 9/0004; G01L 21/14; G01L 23/02; G01L 9/003; G01L 9/025; G01L 9/085; G01L 1/14; G01L 1/148; G01L 9/0058; G01L 9/105; G01L 7/061; G01L 9/002; G01L 7/02; G01L 13/028; G01L 1/2231; G01L 23/28; G01L 9/0095; G01L 1/162; G01L 7/12; G01L 9/0032; G01L 9/0038; G01L 19/0076; G01L 7/024; G01L 21/10; G01L 1/246; G01L 19/149; G01L 7/086; G01L 1/005; G01L 7/06; G01L 7/102; G01L 1/2206; G01L 13/021; G01L 27/02; G01L 5/228; G01L 1/2262; G01L 1/24; G01L 23/00; G01L 9/0094; G01L 1/26; G01L 9/0082; G01L 1/125; G01L 11/06; G01L 9/0097; G01L 1/2268; G01L 21/30; G01L 21/34; G01L 23/221; G01L 7/20; G01L 19/144; G01L 23/26; G01L 7/068; G01L 1/225; G01L 23/32; G01L 7/14; G01L 7/187; G01L 1/144; G01L 1/165; G01L 23/12; G01L 1/146; G01L 1/241; G01L 7/045; G01L 1/086; G01L 7/108; G01L 9/18; G01L 13/04; G01L 17/005; G01L 5/18; G01L 1/127; G01L 1/22; G01L 1/245; G01L 21/32; G01L 1/183; G01L 1/2218; G01L 9/0023; G01L 1/243; G01L 23/145; G01L 5/0047; G01L 9/0088; G01L 1/106; G01L 5/0076; G01L 1/10; G01L 1/186; G01L 223/223; G01L 25/00; G01L 5/165; G01L 9/001; G01L 9/0017; G01L 1/044; G01L 3/245; G01L 5/226; G01L 1/08; G01L 21/16; G01L 3/1485; G01L 5/162; G01L 5/225; G01L 7/026; G01L 7/065; G01L 9/0014; G01L 1/242; G01L 21/24; G01L 3/10; G01L 5/0004; G01L 5/0052; G01L 9/005; G01L 1/00; G01L 1/04; G01L 1/103; G01L 1/2275; G01L 1/247; G01L 21/02; G01L 21/26; G01L 23/225; G01L 3/102; G01L 3/105; G01L 5/0038; G01L 5/223; G01L 5/24; G01L 7/028; G01L 7/10; G01L 9/0011; G01L 5/243; G01L 1/083; G01L 1/12; G01L 21/36; G01L 23/04; G01L 23/14; G01L 23/30; G01L 3/103; G01L 5/00; G01L 5/0028; G01L 5/102; G01L 5/133; G01L 5/166; G01L 7/185; G01L 1/255; G01L 21/08; G01L 5/0033; G01L 5/0057; G01L 5/161; G01L 1/042; G01L 1/122; G01L 1/2225; G01L 1/2243; G01L 1/2256; G01L 1/248; G01L 2009/0066; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/08; G01L 5/10; G01L 5/101; G01L 5/108; G01L 5/16; G01L 5/1627; G01L 5/167; G01L 5/22; G01L 5/28; G01L 23/085; G01L 23/20; G01L 5/0061; G01L 5/0071; G01L 5/008; G01L 5/06; G01L 5/171; G01L 7/106
USPC .................................................. 73/700–756
See application file for complete search history.

(56) References Cited

U.S. PATENT DOCUMENTS

2022/0099549 A1* 3/2022 Kim ................ G01N 29/2443
2023/0057869 A1* 2/2023 Alcheikh ........... G01R 33/0385

FOREIGN PATENT DOCUMENTS

| WO | 2016034940 A1 | 3/2016 | |
|---|---|---|---|
| WO | WO-2018123118 A1 * | 7/2018 | ............ G01K 1/16 |
| WO | 2019021073 A1 | 1/2019 | |

OTHER PUBLICATIONS

Kazmi, S.N.R., et al., "Mechanical Computing Using Multifrequency Excited NEMS Resonator," Proceedings of the 13th Annual IEEE International Conference on Nano/Micro Engineered and Molecular Systems, Apr. 22-26, 2018, Singapore, pp. 229-233, IEEE.
Written Opinion of the International Searching Authority in corresponding/related International Application No. PCT/IB2020/053571, dated Jul. 3, 2020.

* cited by examiner

WIDE RANGE HIGHLY SENSITIVE PRESSURE SENSOR BASED ON HEATED MICROMACHINED ARCH BEAM

CROSS-REFERENCE TO RELATED APPLICATIONS

This application is a U.S. National Stage Application of International Application No. PCT/IB2020/053571, filed on Apr. 15, 2020, which claims priority to U.S. Provisional Patent Application No. 62/835,757, filed on Apr. 18, 2019, entitled "WIDE RANGE HIGHLY SENSITIVE PRESSURE SENSOR BASED ON HEATED MICROMACHINED ARCH BEAM," the disclosures of which are incorporated herein by reference in their entirety.

BACKGROUND

Technical Field

Embodiments of the subject matter disclosed herein generally relate to pressure sensors and pressure microsensors.

Discussion of the Background

In recent years, miniaturized vacuum pressure sensors have received increasing attention, in addition to other environmental sensors, such as temperature, flow, gas, and mass sensors. Pressure micro-sensors have been explored for applications, such as industrial control, healthcare, medical testing, aerospace, meteorology, and environmental monitoring. Different sensing mechanisms and arrangements have been used for the detection of air-pressure, for example, capacitive, piezoelectric, piezoresistive, and resonant. Resonant pressure micro-sensors have the advantage of digital frequency output, which can be measured with high precision using simple electronic circuits. Their principle of operation of resonant pressure micro-sensors is based on tracking the resonant frequency shift caused by the change of internal stress due to the change of the surrounding air pressure. Compared to other sensing mechanisms, tracking the resonant frequency shift yields high accuracy, high stability, high sensitivity, and better immunity to noise.

The resonant frequency tuning of silicon resonators can be achieved by electrostatic, magnetic, thermal, or electrothermal excitation. Despite the higher power consumption, electrothermal excitation is a more robust technique and requires low actuation voltages. In addition, electrothermal excitation is simpler in fabrication compared to other methods. A previous sensitive pressure-sensor based on the convective cooling of an electrothermally heated resonant straight micro-beam utilized the fundamental mode operated near the buckling point. Sensitivity up to 77,081 ppm/Torr ($77,081 \times 10^{-6}$/Torr) was demonstrated for a pressure range from 1 to 10 Torr. To alleviate the dip in frequency near the buckling instability, a pressure-sensor was demonstrated using an initially curved arch micro-beam. That pressure-sensor showed a sensitivity of 10,482 ppm/Torr.

Previous arrangements of pressure-sensors, however, were limited to a narrow range of pressures. Thus, there is a need for a pressure sensing device with enhanced sensitivity and wide pressure range, which is also simple in fabrication, operation, and sensing scheme.

BRIEF SUMMARY OF THE INVENTION

According to an embodiment, a pressure sensor uses an electrothermally heated initially curved micro-beam exhibiting the veering phenomenon among its first two symmetric vibration modes. The pressure sensor offers more continuity in frequency variations and thus high sensitivity in wide range of pressure.

According to another embodiment, there is a method for sensing pressure by electrothermally heating a curved microbeam having a plurality of resonant frequencies, electrostatically driving the curved microbeam at a first symmetric resonant frequency and a second symmetric resonant frequency selected from the plurality of resonant frequencies, monitoring changes in the first symmetric resonant frequency and the second symmetric resonant frequency caused by an ambient pressure surrounding the curved microbeam and using the monitored changes in the first symmetric resonant frequency and the second symmetric resonant frequency to determine the ambient pressure.

In one embodiment, an electrothermal voltage is passed along a length of the curved microbeam to heat the curved microbeam electrothermally. A suitable electrothermal voltage is 4 VDC. In one embodiment, the electrothermal voltage is selected to cause a maximum displacement at a midpoint along the length of the curved microbeam of less than 12 μm and a temperature within the curved microbeam below a curved microbeam melting point.

In one embodiment, the first symmetric resonant frequency is associated with a first symmetric vibration mode, and the second symmetric resonant frequency is associated with a second symmetric vibration mode. In one embodiment, the first symmetric vibration mode is a fundamental vibration mode, and the second symmetric vibration mode is a third vibration mode. In one embodiment, an AC power source in communication with the curved microbeam and an actuating electrode to deliver an AC signal to the curved microbeam to drive the curved microbeam electrostatically. The actuating electrode extends along a length of the curved microbeam and is spaced from the curved microbeam. In one embodiment, the actuating electrode is spaced from the curved microbeam by a distance of at least 12 μm.

In one embodiment, monitoring changes in the first symmetric resonant frequency and the second symmetric resonant frequency includes monitoring changes in the second symmetric resonant frequency when increases in the ambient pressure cause decreases in the second symmetric resonant frequency and monitoring changes in the first symmetric resonant frequency when increases in the ambient pressure cause increases in the second symmetric resonant frequency.

In one embodiment, the curved microbeam is selected to have dimensions and an initial rise at a midpoint along a length of the curved microbeam that produce strong veering between a plot of changes in the first symmetric resonant frequency with ambient pressure and changes in the second symmetric resonant frequency with ambient pressure. In one embodiment, a curved microbeam is selected wherein the length is 800 μm, and the initial rise at the midpoint along the length is 2.6 μm. In addition, the curved microbeam has a width perpendicular to the length of 25 μm and a thickness perpendicular to the length and parallel to the initial rise of 1.5 μm.

According to another embodiment, there is a resonant pressure sensor containing a curved microbeam with a pair of opposing ends, a length extending between the pair of opposing ends, and a plurality of resonant frequencies, an actuating electrode extending along the length of the curved microbeam and spaced from the curved microbeam, an AC power source in communication with one of the opposing ends and the actuating electrode to deliver an AC signal at a first symmetric resonant frequency and a second symmetric resonant frequency selected from the plurality of resonant frequencies to the curved microbeam, a DC power source in communication with the opposing ends to pass an electrothermal voltage along a length of the curved microbeam, a frequency monitoring device to monitor changes in the first symmetric resonant frequency and the second symmetric resonant frequency caused by an ambient pressure surrounding the curved microbeam.

In one embodiment, the curved microbeam has dimensions and an initial rise from the opposing ends at a midpoint along the length of the curved microbeam that produce strong veering between a plot of changes in the first symmetric resonant frequency with ambient pressure and changes in the second symmetric resonant frequency with the ambient pressure. In one embodiment, the length is 800 μm, and the initial rise at the midpoint along the length is 2.6 μm. In addition, the curved microbeam has a width perpendicular to the length of 25 μm and a thickness perpendicular to the length and parallel to the initial rise of 1.5 μm.

In one embodiment, the actuating electrode is spaced from the curved microbeam by a distance of at least 12 μm at the opposing ends of the curved microbeam. In one embodiment, the first symmetric resonant frequency is associated with a first symmetric vibration mode, and the second symmetric resonant frequency is associated with a second symmetric vibration mode. In one embodiment, the first symmetric vibration mode is a fundamental vibration mode, and the second symmetric vibration mode is a third vibration mode. In one embodiment, the electrothermal voltage comprises 4 VDC. In one embodiment, the electrothermal voltage causes a maximum displacement at a midpoint along the length of the curved microbeam between the opposing ends of less than 12 μm and a temperature within the curved microbeam below a curved microbeam melting point. In one embodiment, the frequency monitoring device comprises a laser Doppler vibrometer.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a resonant pressure sensor. However, the embodiments to be discussed next are not limited to a single resonant pressure sensor, but may be applied to plural resonant pressure sensors.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
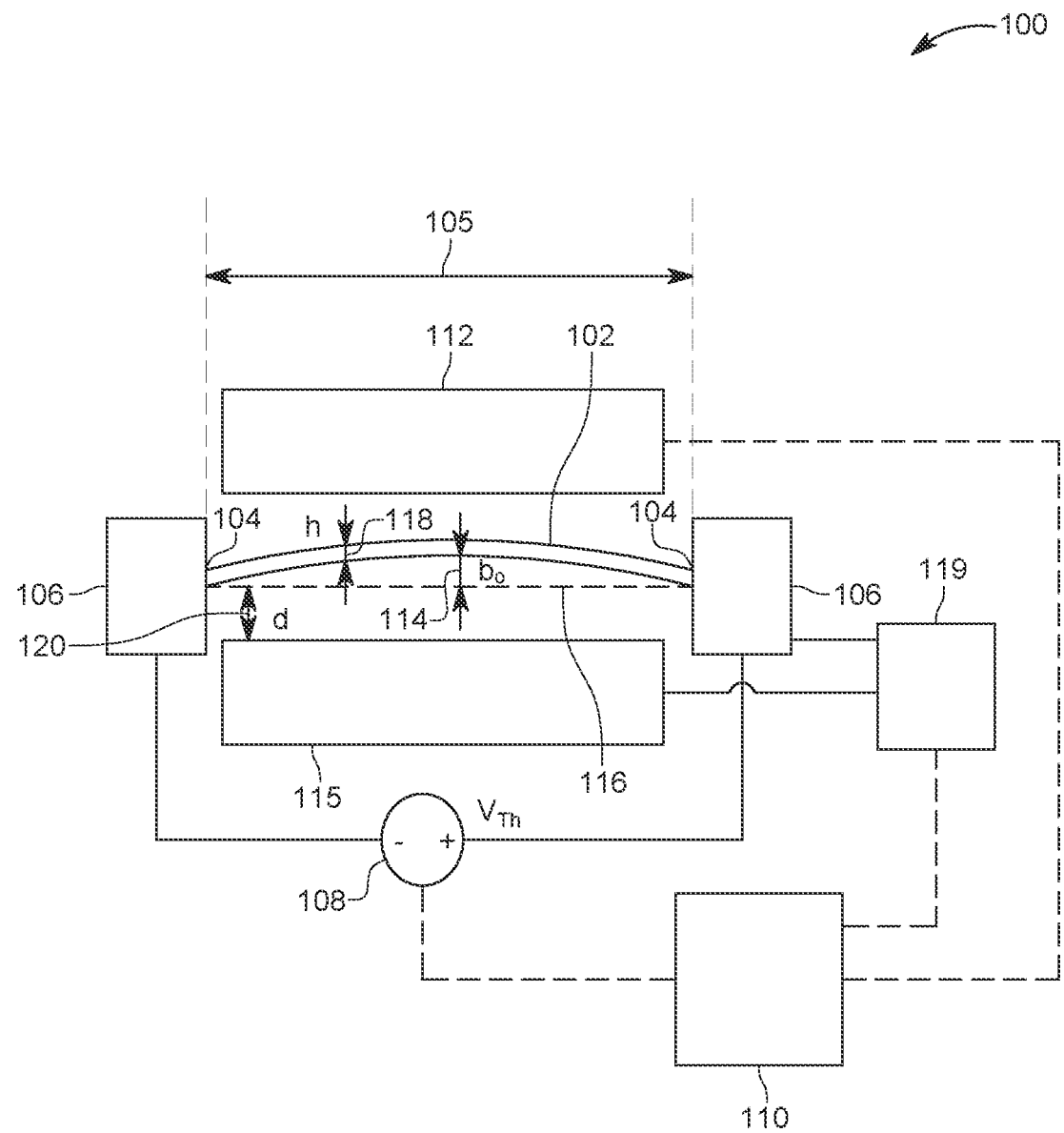
FIG. 1 is a schematic representation of an embodiment of a resonant pressure sensor.

Referring initially to FIG. 1, exemplary embodiments are directed to a resonant pressure sensor 100. The resonant pressure sensor includes an arched or curved microbeam 102. Suitable materials for the curved microbeam include, but are not limited to, silicon, gold, etc. In one embodiment, the resonant pressure sensor containing the arched or curved microbeam resonator is fabricated from Silicon-On-Insulator Multi User MEMS Processes (SOIMUMPs).

The curved microbeam 102 includes a pair of opposing ends 104 and a length 105 extending between the pair of opposing ends. The opposing ends are secured in mounting or clamping structures 106. In one embodiment, the clamping structures are constructed of a conductive material to communicate DC and AC currents to the curved microbeam. Therefore, the opposing ends are fixed, and the curved microbeam exhibits a plurality of resonant frequencies. The curved microbeam includes symmetric resonant frequencies associated with symmetric vibration modes. Exemplary embodiments utilize two symmetric resonant frequencies, e.g., a first symmetric resonant frequency and a second symmetric resonant frequency, to drive the curved microbeam electrostatically. The selected resonant frequencies are selected from the plurality of resonant frequencies associated with the curved microbeam. In one embodiment, the first symmetric resonant frequency is associated with a first symmetric vibration mode and the second symmetric resonant frequency is associated with a second symmetric vibration mode. In one embodiment, the first symmetric vibration mode is a fundamental vibration mode of the curved microbeam, and the second symmetric vibration mode is a third vibration mode of the curved microbeam.

Figure 2:
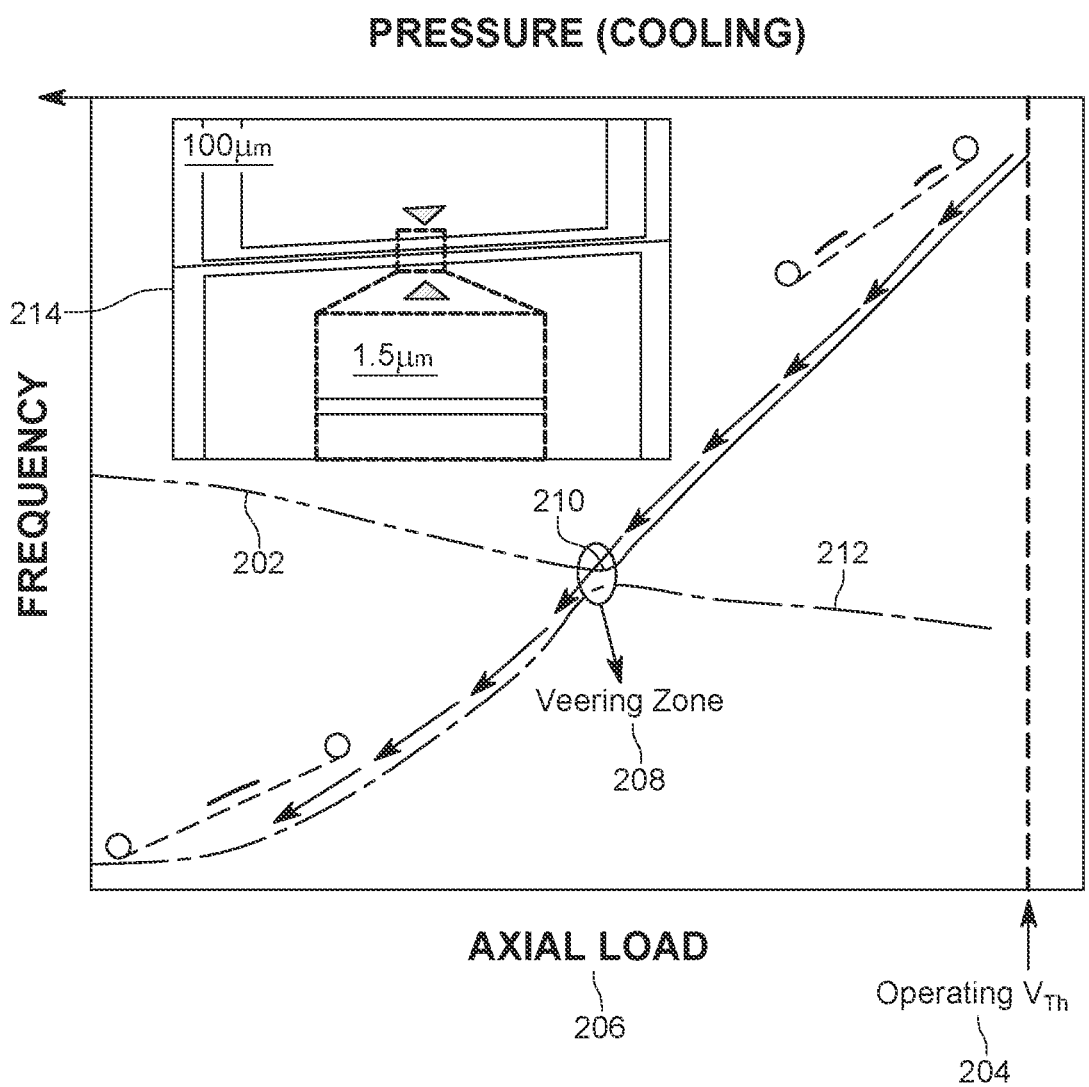
FIG. 2 is a graph of frequency versus axial load that illustrates operation of the resonant pressure sensor using an electrothermally heated clamped-clamped curved microbeam.

Referring now to FIG. 2, the second symmetric resonant frequency of the second symmetric vibration mode 202, e.g., the third vibration mode, is monitored while the curved microbeam is actuated with an electrothermal voltage 204, $V_{Th}$. As the pressure applied to the curved microbeam 102, i.e., the ambient pressure, increases, the axial load 206 of the curved microbeam decreases due to the cooling effect of the surrounding air. Therefore, the second symmetric resonant frequency decreases until reaching the veering zone 208, i.e., the transition point 210. After the transition point 210, the frequency tracking switches to the first symmetric resonant frequency 212, e.g., the fundamental resonant frequency. When using the resonant pressure sensor 100 to determine the ambient pressure, changes in the second symmetric resonant frequency are monitored when increases in the ambient pressure cause decreases in the second symmetric resonant frequency, and changes in the first symmetric resonant frequency are monitored when increases in the ambient pressure cause increases in the second symmetric resonant frequency. The inset 214 shows an image of scanning electron microscopic (SEM) used for measurements of the fabricated curved micro-beam resonator.

As illustrated in FIG. 2, monitoring between the first and second symmetric resonant frequencies changes or switches on either side of the veering zone. The plots of the first and second symmetric resonant frequencies do not cross, by get very close to each other at the transition point before veering away from each other. The smaller the distance between the plots of the first and second symmetric resonant frequencies at the transition point, the stronger the veering, which is preferred.

Returning to FIG. 1, the curved microbeam 102 has an initial rise 114, $b_0$, from the opposing ends or from the straight level 116 at a midpoint along the length 105 of the curved microbeam that produce strong veering between the plot (FIG. 2) of changes in the first symmetric resonant frequency with ambient pressure and changes in the second symmetric resonant frequency with ambient pressure. In one embodiment, the curved microbeam has a length 105 of 800 µm, an initial rise at the midpoint along the length of 2.6 µm, a width perpendicular to the length of 25 µm, and a thickness 118, h, perpendicular to the length and parallel to the initial rise of 1.5 µm. One skilled in the art would understand that variations of these dimensions about +/−20% would also achieve some of the advantages of this embodiment. Exemplary embodiments of the pressure resonant sensor provide simplicity in fabrication with low-cost and size scalability.

The resonant pressure sensor includes an actuating electrode 115 extending along the length of the curved microbeam 102 to apply VDC and AC actuation between the actuating electrode and the curved microbeam. The actuating electrode is spaced from the curved microbeam by a given distance 120, d. In one embodiment, the given distance is the transduction gap between the actuated electrode and the clamped ends of the curved microbeam. As the curved microbeam curves away from the actuating electrode, the activating electrode is spaced from the curved microbeam at least by the given distance. In one embodiment, the given distance is 12 µm. In one embodiment, the given distance is greater than 12 µm. In one embodiment, the given distance is less than 8 µm. In general, using a higher gap helps the beam to deflect with high displacement while actuated with electrothermal voltage and low pressure.

The resonant pressure sensor includes an AC power source 119 in communication with one of the opposing ends and the actuating electrode to deliver an AC signal at both the first symmetric resonant frequency and the second symmetric resonant frequency. Suitable AC power sources include, but are not limited to, amplifiers. In one embodiment, the AC power source is in communication with the clamping mechanism holding one of the opposing ends. In one embodiment, the first symmetric resonant frequency is associated with a first symmetric vibration mode, and the second symmetric resonant frequency is associated with a second symmetric vibration mode. In one embodiment, the first symmetric vibration mode is a fundamental vibration mode, and the second symmetric vibration mode is a third vibration mode.

The resonant pressure sensor includes a DC power source 108 in communication with the opposing ends to pass an electrothermal voltage along a length of the curved microbeam. In one embodiment, the DC power source is in communication with the clamping mechanisms holding the opposing ends. The electrothermal voltage is selected to cause a desired maximum rise 114 at a midpoint along the length of the curved microbeam between the opposing ends. In one embodiment, the maximum rise is less than 12 µm. The electrothermal voltage increases the temperature within the curved microbeam. In one embodiment, the electrothermal voltage is selected to ensure that the temperature of the curved beam stays below the curved beam melting point, which for silicon is 875 K. In one embodiment, the electrothermal voltage is less than or equal to 4 VDC. In another embodiment, the electrothermal voltage is less than or equal to 8 or 8.5 VDC. Those skilled in the art will understand that these voltages depend on the material of the electrode and its dimensions.

The resonant pressure sensor includes a frequency monitoring device 112 to monitor changes in the first symmetric resonant frequency and the second symmetric resonant frequency caused by the ambient pressure surrounding the curved microbeam while the curved microbeam is electrothermally tuned by the applied electrothermal voltage and electrostatically driven at the first symmetric resonant frequency and the second symmetric resonant frequency by the applied AC signal. In one embodiment, the frequency monitoring device is a detection electrode. Preferably, the frequency monitoring device is a laser Doppler vibrometer. Any other device that can determine the frequency of the microbeam can be used for the pressure sensor.

In one embodiment, the resonant pressure sensor includes control electronics 110. The control electronics are in communication with the DC power source, the AC power source and the frequency monitoring device 112. Suitable control electronics include logical processors, computer storage and executable software configured to provide the desired functioning and monitoring for the resonant pressure sensor. In one embodiment, the control electronics use the monitored changes in the first symmetric resonant frequency and the second symmetric resonant frequency to determine the ambient pressure.

Figure 3:
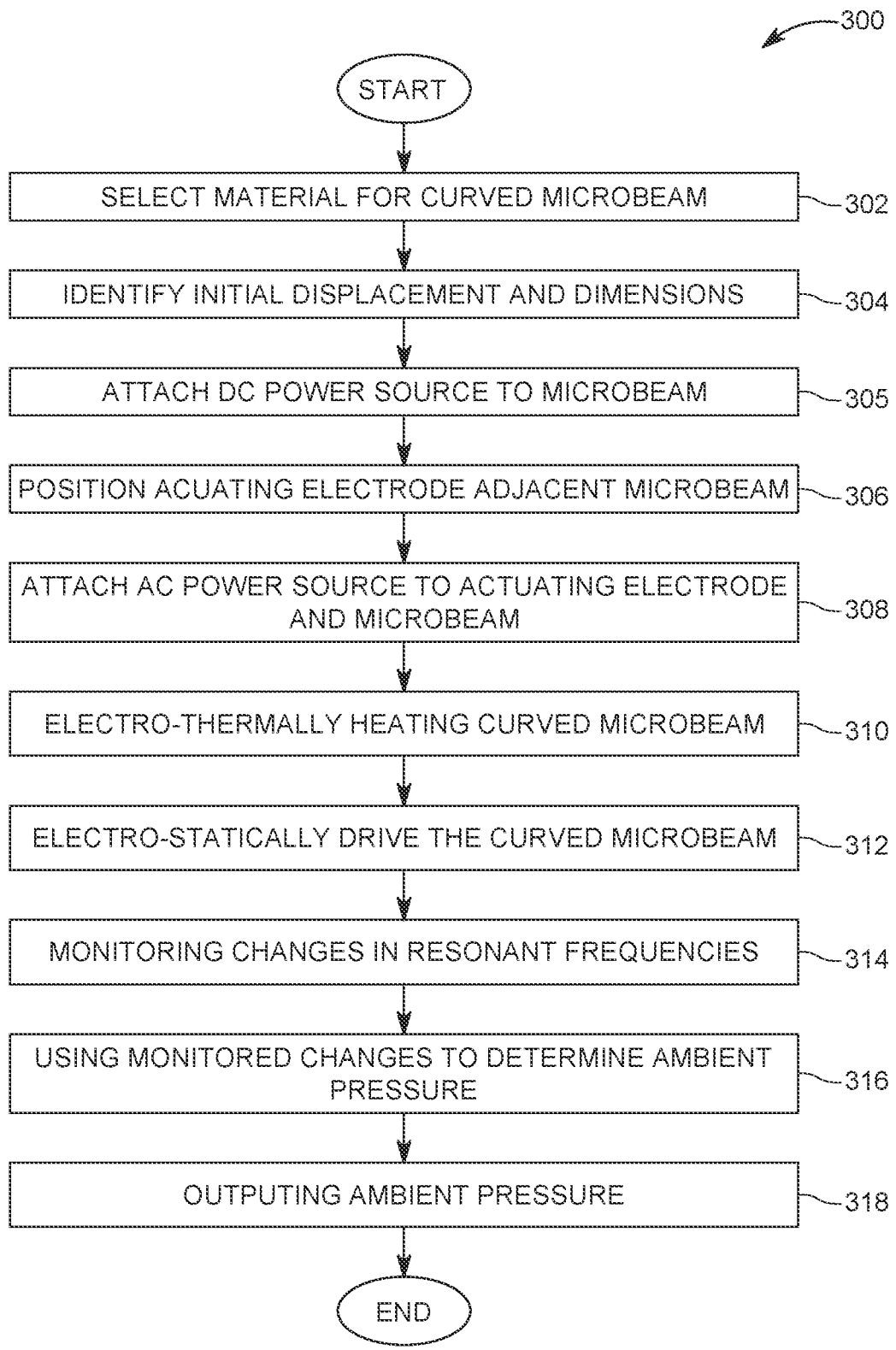
FIG. 3 is a flow chart illustrating and embodiment of a method for measuring pressure using a resonant pressure sensor.

Referring now to FIG. 3, exemplary embodiments are directed to a method for sensing pressure 300, for example, using resonant pressure sensors as described herein. A desired material for the curved microbeam is selected 302. In one embodiment, the curved microbeam is silicon. The dimensions and initial curved displacement of the curved microbeam are identified 304. In one embodiment, the curved microbeam has dimensions and an initial rise at a midpoint along a length of the curved microbeam that produce strong veering between a plot of changes in the first symmetric resonant frequency with ambient pressure and changes in the second symmetric resonant frequency with ambient pressure. In one embodiment, the curved microbeam has a length of 800 μm, an initial rise at the midpoint along the length of 2.6 μm, a width perpendicular to the length of 25 μm and a thickness perpendicular to the length and parallel to the initial rise of 1.5 μm. The curved microbeam has a plurality of resonant frequencies.

A DC power source is attached to opposing ends of the curved microbeam 305. An actuating electrode is positioned adjacent the curved microbeam 306. The actuating electrode extends along a length of the curved microbeam and is spaced from the curved microbeam. In one embodiment, positioning the actuating electrode adjacent the curved microbeam includes spacing the actuating electrode from the curved microbeam by a distance of at least 12 μm. An AC power source is attached to the actuating electrode and one end of the curved microbeam 308.

The curved microbeam is electrothermally heated 310. In one embodiment, electrothermal heating the curved microbeam includes passing an electrothermal voltage from the DC power source along a length of the curved microbeam. Suitable electrothermal voltages are less than or equal to 4 VDC or less than or equal to 8 or 8.5 VDC. In one embodiment, passing the electrothermal voltage includes selecting the electrothermal voltage to cause a maximum rise at a midpoint along the length of the curved microbeam of less than 12 μm and a temperature within the curved microbeam below a curved microbeam melting point.

The curved microbeam is electrostatically driven 312 at a first symmetric resonant frequency and a second symmetric resonant frequency selected from the plurality of resonant frequencies using the attached AC power source. In one embodiment, the first symmetric resonant frequency is associated with a first symmetric vibration mode, and the second symmetric resonant frequency is associated with a second symmetric vibration mode. In one embodiment, the first symmetric vibration mode is a fundamental vibration mode, and the second symmetric vibration mode is a third vibration mode.

Changes in the first symmetric resonant frequency and the second symmetric resonant frequency caused by an ambient pressure surrounding the curved microbeam are monitored 314. In one embodiment, changes in the second symmetric resonant frequency are monitored when increases in the ambient pressure cause decreases in the second symmetric resonant frequency, and changes in the first symmetric resonant frequency are monitored when increases in the ambient pressure cause increases in the second symmetric resonant frequency. The monitored changes in the first symmetric resonant frequency and the second symmetric resonant frequency are used to determine the ambient pressure 316, and the determined ambient pressure is outputted 318. For example, the ambient pressure can be displayed or communicated to a requesting program or process.

Figure 4:
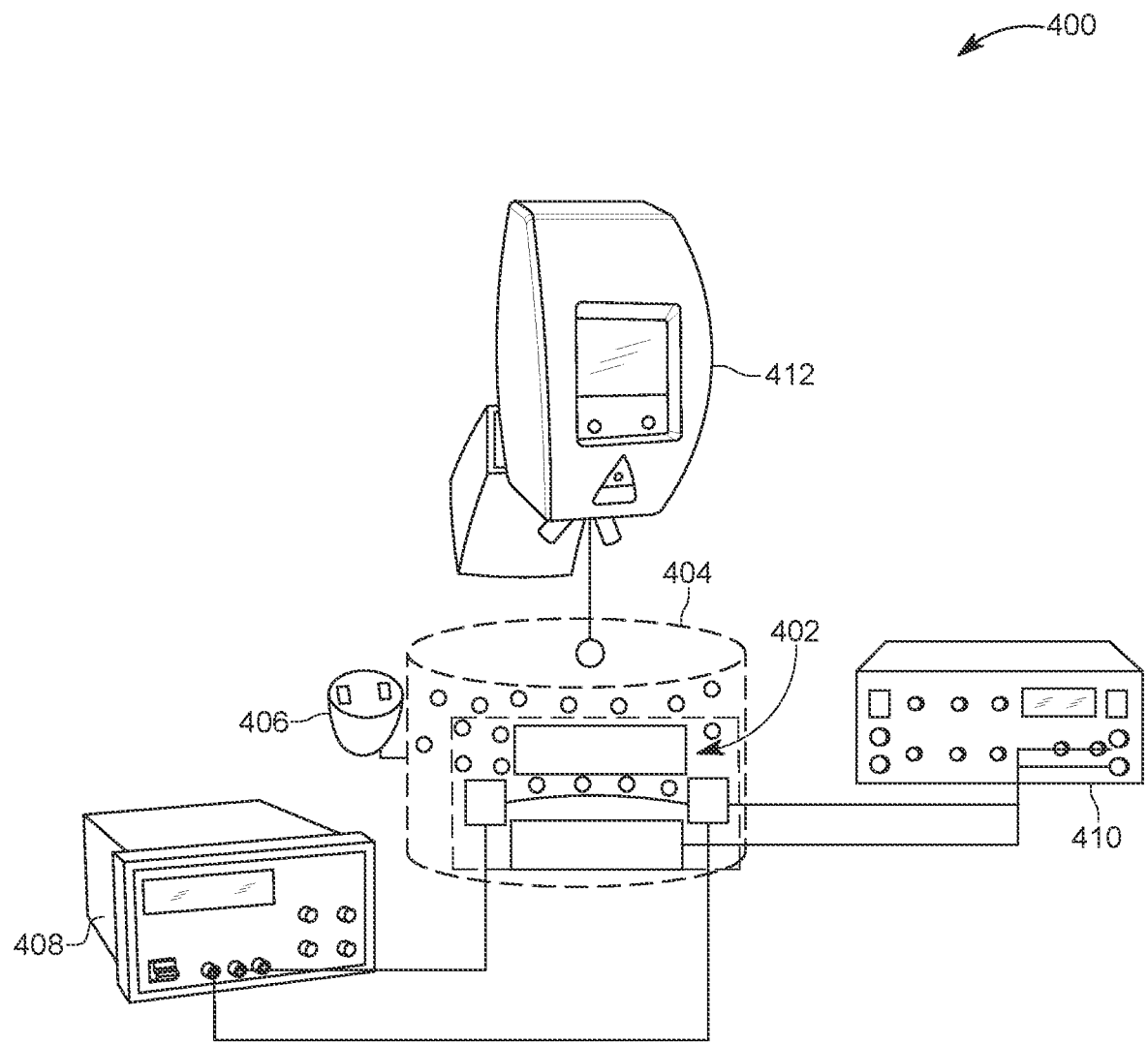
FIG. 4 is a schematic representation of an experimental setup for testing the resonant pressure sensor.

Referring now to FIG. 4, an experimental setup 400 used to test the resonant pressure sensor is illustrated. The resonant pressure sensor 402, e.g., an arch MEMS resonator was placed inside a controllable test chamber 404 equipped with a pressure gauge 406. A DC voltage power source 408 was connected to the curved microbeam, and an amplifier 410 was connected to an end of the curved microbeam and the actuating electrode. A laser Doppler vibrometer 412, e.g., a Polytec (MSA 500), commercially available from Polytec GbmH of Waldbronn, Germany, was positioned to measure resonant frequencies within the curved microbeam. The pressure within the test chamber was varied from 38 mTorr to atmospheric pressure. Therefore, the detection limit of the ambient pressure sensor, as tested, was 38 mTorr. The resonant pressure sensor was electrothermally tuned and electrostatically driven using the DC voltage power source and the amplifier. The laser Doppler vibrometer measured the resonant frequencies of the curved microbeam while the curved microbeam was driven electrostatically. The DC power source applied a voltage, $V_{Th}$, to induce a current flowing through the curved microbeam. The current heated the curved microbeam Joule's heating effect, altering the stiffness and resonant frequencies of the curved microbeam.

Frequency tuning of the resonant pressure sensor utilizes the effect of the induced compressive axial load in the curved microbeam due to the heating of the curved microbeam by electrothermal actuation. Heating increases the curvature of the curved microbeam and the stiffness of the curved microbeam. By choosing the geometrical parameters and the initial shape of the arch, the veering phenomenon (avoided-crossing) between two vibration modes, i.e., the first two symmetric vibration modes is strongly activated. Variations of the resonance frequencies of the curved microbeam around the veering zone, e.g., before, on, and after veering of the first two symmetric vibration modes, while applying a constant DC electrothermal voltage $V_{Th}$ is studied. Therefore, the curved microbeam is configured deliberately to exhibit the veering (near crossing) phenomenon among two of its vibration modes, e.g., the first two symmetric vibration modes.

Figure 5:
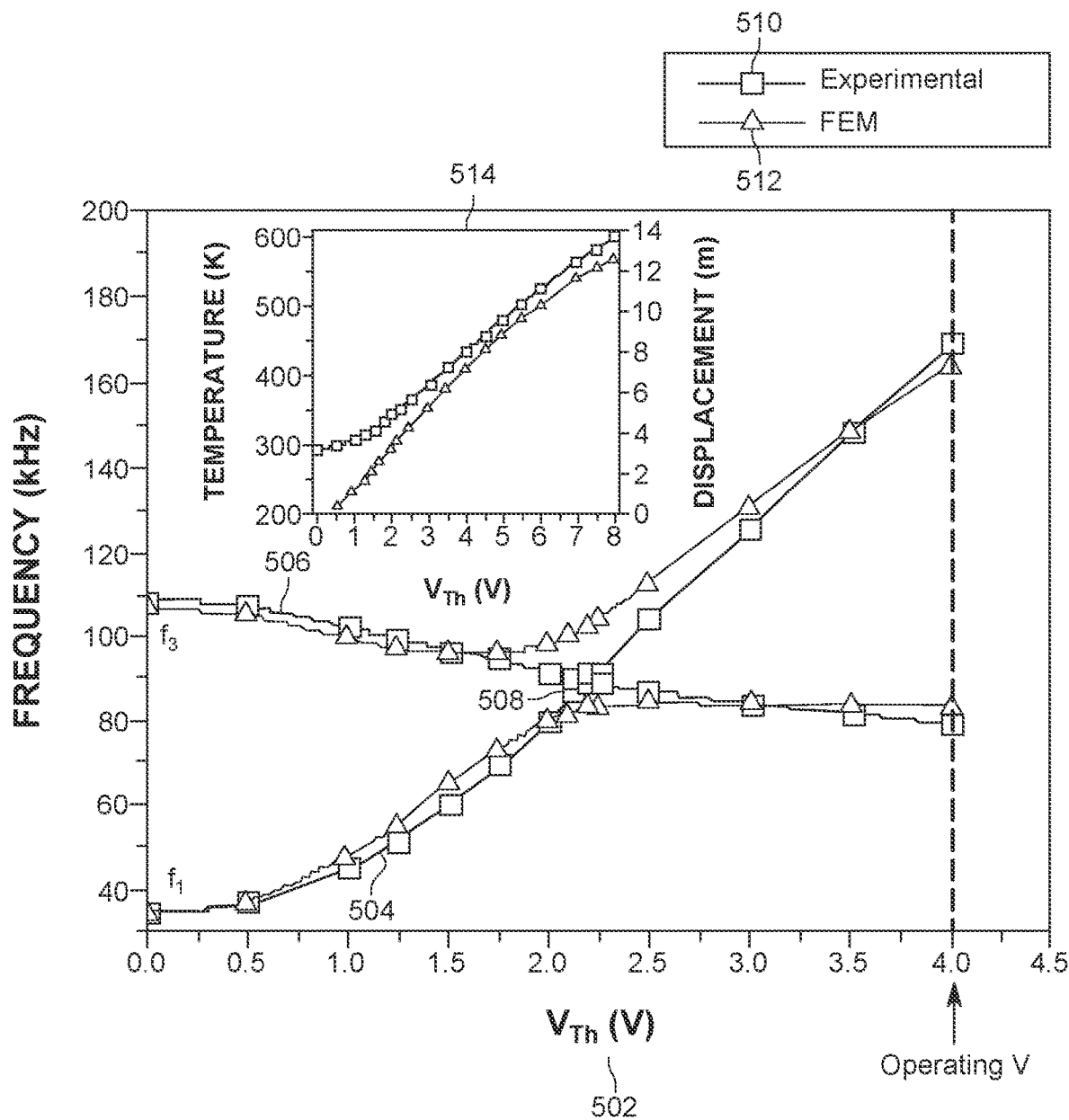
FIG. 5 is a graph illustrating experimental data and finite element simulations of the first two symmetric resonant frequencies of the curved microbeam while varying the electrothermal voltage at 38 mTorr pressure.
Figure 6:
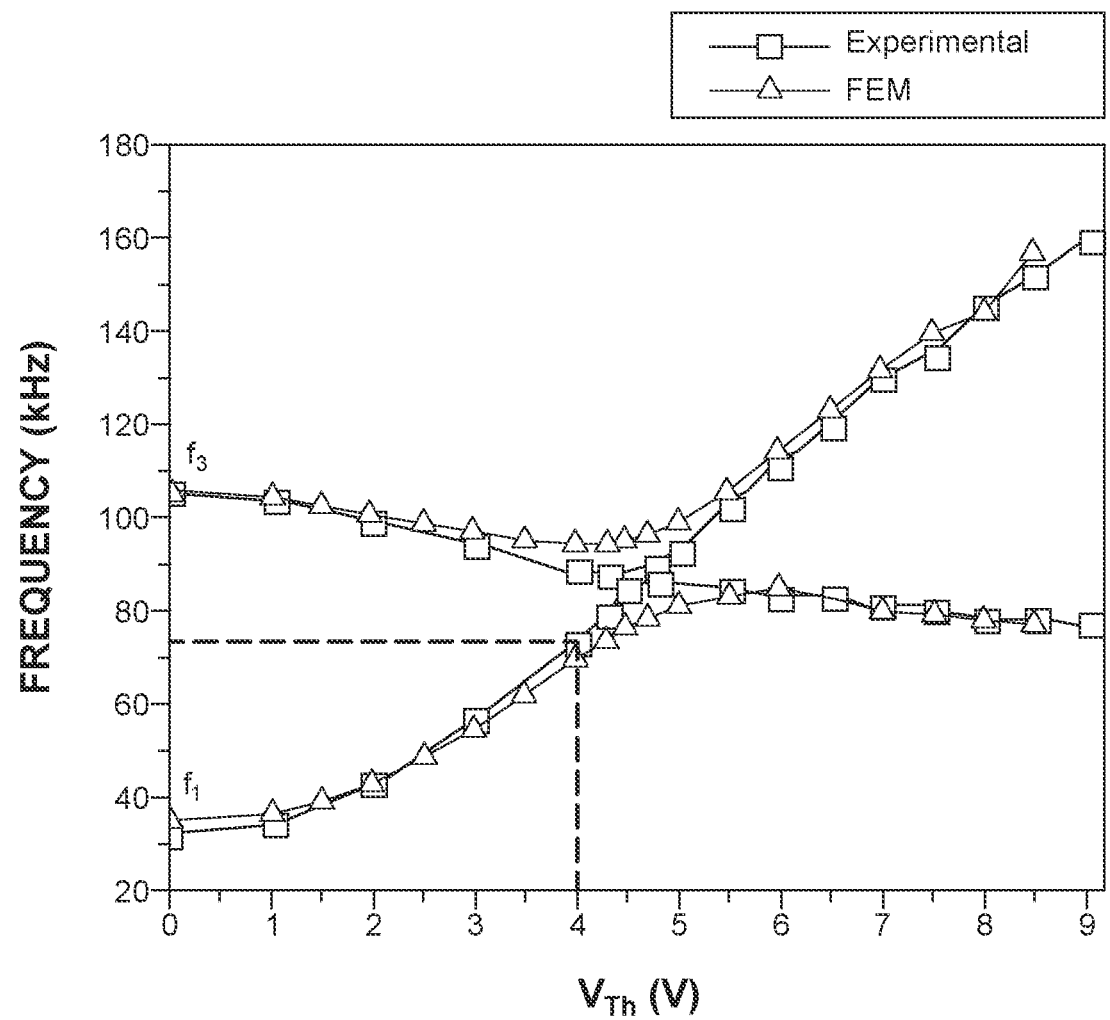
FIG. 6 is a graph illustrating experimental data and finite element simulations of the first two symmetric resonant frequencies of the curved microbeam while varying the electrothermal voltage at atmospheric pressure.

Referring to FIG. 5, changing $V_{Th}$ 502 while maintaining the ambient pressure at low vacuum (38 mTorr) increases the first symmetric resonant frequency 504 up to twice its fundamental value due to the continuous increase in the curvature and stiffness of the curved microbeam. In addition, the third resonance frequency ($f_3$) 506 decreases. This decrease in the third resonance frequencies continues until the third resonance frequency approaches very close to the first resonance frequency ($f_1$) 508. After the curves approach very close, the curves of both the first and third resonance frequencies veer away from each other with a high curvature. Referring to FIG. 6, the same behavior is shown when the curved microbeam is operated at atmospheric pressure but for higher $V_{Th}$. The higher $V_{Th}$ is used due to the cooling effect on the curved microbeam caused by the high pressure of the surrounding air. In addition to the experimental data 510 illustrated, for example, in FIG. 5, simulation results 512, obtained using a FEM model using COMSOL Multiphysics, are also illustrated. The simulation results indicate similar behavior to the experimental data.

The temperature of the curved microbeam, e.g., a silicon (Si) beam, is maintained below its melting point, i.e., 875 K, while being actuated by $V_{Th}$. The inset schematic 514 (FIG. 5) illustrates the FEM results of the maximum temperature and mid-point rise at 38 mTorr of the tested curved microbeam with varying $V_{Th}$. These results are used to select the suitable electrothermal voltage to operate the curved microbeam with a maximum displacement lower than 12 μm, i.e., the gap between the actuated electrode and the clamped end of the micro-beam, and a temperature lower than 875 K. For the illustrated example, $V_{Th}$=4 VDC was selected. The illustrated simulation indicates a maximum displacement of 7.3 μm and a temperature of 438 K at 4 VDC. The corresponding measured resonant frequency values near the first resonant mode (at 1 atm) and the third resonant node (at 38 mTorr) mode are 79 kHz and 169 kHz, respectively.

Figure 7:
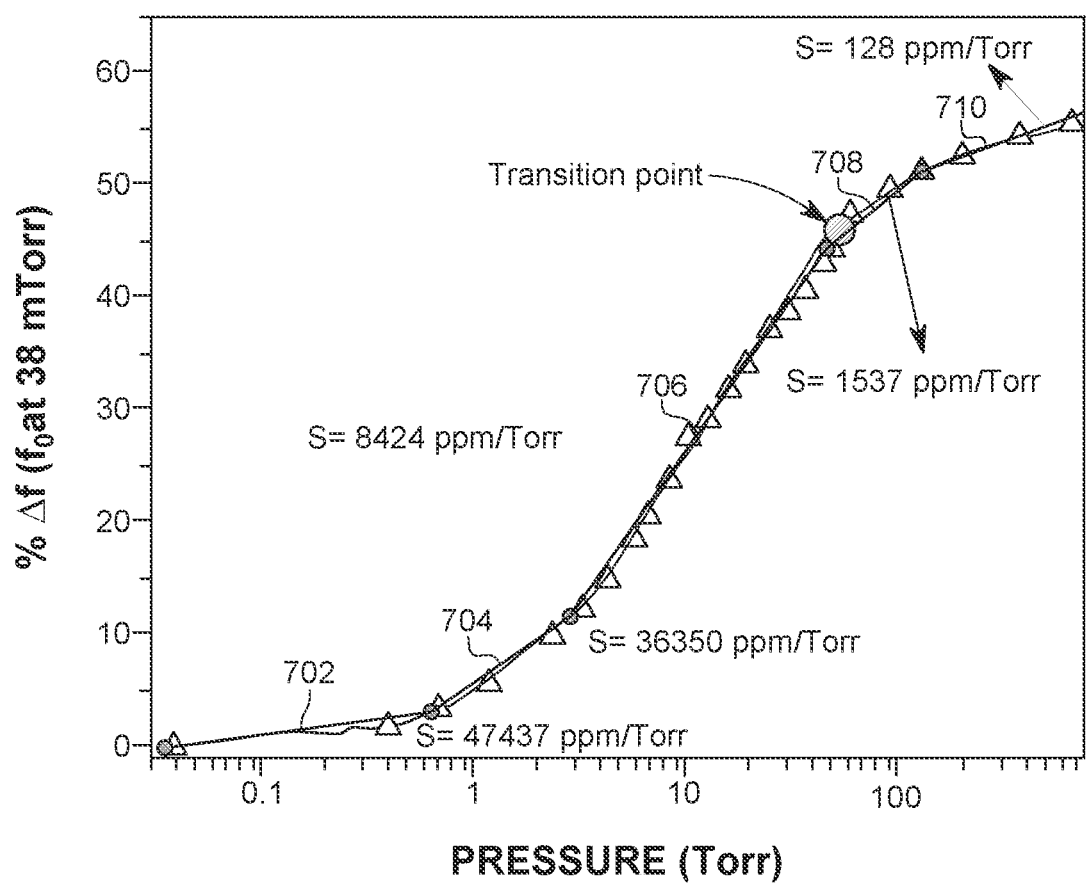
FIG. 7 is a graph illustrating the measured percentage relative shift of the resonant frequency with pressure for an electrothermal voltage of 4 V.

Referring to FIG. 7, experimental data obtained for the relative frequency shift Δf with the pressure p for the applied electrothermal voltage, $V_{Th}$, at 4 V is illustrated. The ambient pressure was swept from 38 mTorr to atmospheric pressure. The relative frequency shift $\Delta f$ is defined as $(f_0-f)/f_0$, where $f_0$ and f are the frequency of the microbeam at 38 mTorr and during the measurement with a given pressure, respectively. The results show five linear trends ((38 mTorr to 0.7 Torr) 702, (0.7 to 3.3 Torr) 704, (3.3 to 49 Torr) 706, (49 to 125 Torr) 708 and (125 Torr to 1 atm) 710). For each trend, the sensitivity (S) of the curved microbeam is calculated using the formula $f/(P_{max}-P_{min})$, where $P_{max}$ and $P_{min}$ are the maximum and minimum pressures, respectively. As shown, the first linear regime 702 shows the highest sensitivity against pressure (S=47,473 ppm/Torr). The sensitivity decreases with the pressure.

Referring to Table 1, the sensitivity of the resonant pressure sensor 100 (illustrated in the last line of the table) is significantly higher compared with other previously reported pressure sensors.

TABLE 1

Summary of Some of the Reported Pressure Sensors

| Materials | Pressure Range (Torr) | Max Pressure Detected (Torr) | Sensitivity (Torr$^{-1}$) | Optimal Value (Torr$^{-1}$) |
|---|---|---|---|---|
| Si/ZnO Si | 112-6375 | 6375 | 5.46 ppm | 0.19 ppm |
| Add Si | 1, 2, 3, 4, 5, 6, 7, 8, 9, 10 | 30 | 10,482 ppm | 3296 ppm |
| p-Si | 0-0.75 | 75 | 4341 ppm | 1413 ppm |
| SiN | 0.02-10 | 10 | 6918 ppm | 478 ppm |
| Graphene/SiO$_2$/Si | 150-750 | 750 | 3.95 ppm | 0.0023 ppm |
| LRGO/DVD disk | 0.0075-2.35 | 2.35 | 12000 ppm | 383 ppm |
| Si | $38 \times 10^{-3} - 10$ | 200 | 27674 ppm | 153,170 ppm |
| Si | $38 \times 10^{-3} - 200$ | 200 | 2689 ppm | 1446 ppm |

The results show a high sensitivity of 2689 ppm/Torr in a wide pressure range up to 200 Torr (detection limit), which is much higher than previous pressure sensors that were limited to 30 Torr. In general, the performance of a pressure sensor is related to the sensitivity (S) and the maximum detection limit (P). Thus, the relative frequency shift $\Delta f$ multiplied by the sensitivity S can represent the performance of a pressure sensor (optimal value=$(S \times \Delta f)=(S^2 \times P)$). The optimal value of the resonant pressure sensor 100 is 153,170 ppm/Torr, which is much higher than the values associated with other pressure sensors as provided Table 1.

In addition to having a wide pressure range, the resonant pressure sensor 100 has a low power consumption. Power consumption is estimated based on resistive heating of the curved microbeam $(V_{Th})^2/R$, where R is the resistance of the microbeam 102. The resistance of the microbeam is estimated to be 1.34 kΩ. Thus, increasing the resistance of the microbeam will reduce the power consumption. The resonant pressure sensor 100 has a power consumption of around 12 mW. This power consumption is much lower than the power consumption associated with previous electrothermal actuated beams. The sensitivity and power consumption of the resonant pressure sensor 100 can be improved with a microbeam having a higher aspect ratio and construction from a material with a lower thermal conductivity. In one embodiment, the thermal response time of the curved microbeam is 162.8 s. To have a faster response time, the resonant pressure sensor is further miniaturized to a smaller size, e.g., to the nano- and submicron-scale.

To improve the sensitivity, FEM simulation of the resonant pressure sensor was conducted to evaluate the performance of the resonant pressure sensor and optimize the parameters of the resonant pressure sensor. To simulate the heat transfer between the solid and fluid domains, the Joule Heating and Thermal expansion module was coupled with the Conjugate Heat Transfer module. The maximum temperature as shown in FIG. 5 at 514 is calculated from the Joule's heating equation. Device sensitivity is dependent on the applied electrothermal voltage. A higher $V_{Th}$ heats the microbeam more. Therefore, increased air volume, i.e., more pressure, is needed to cool down the microbeam.

Figure 8:
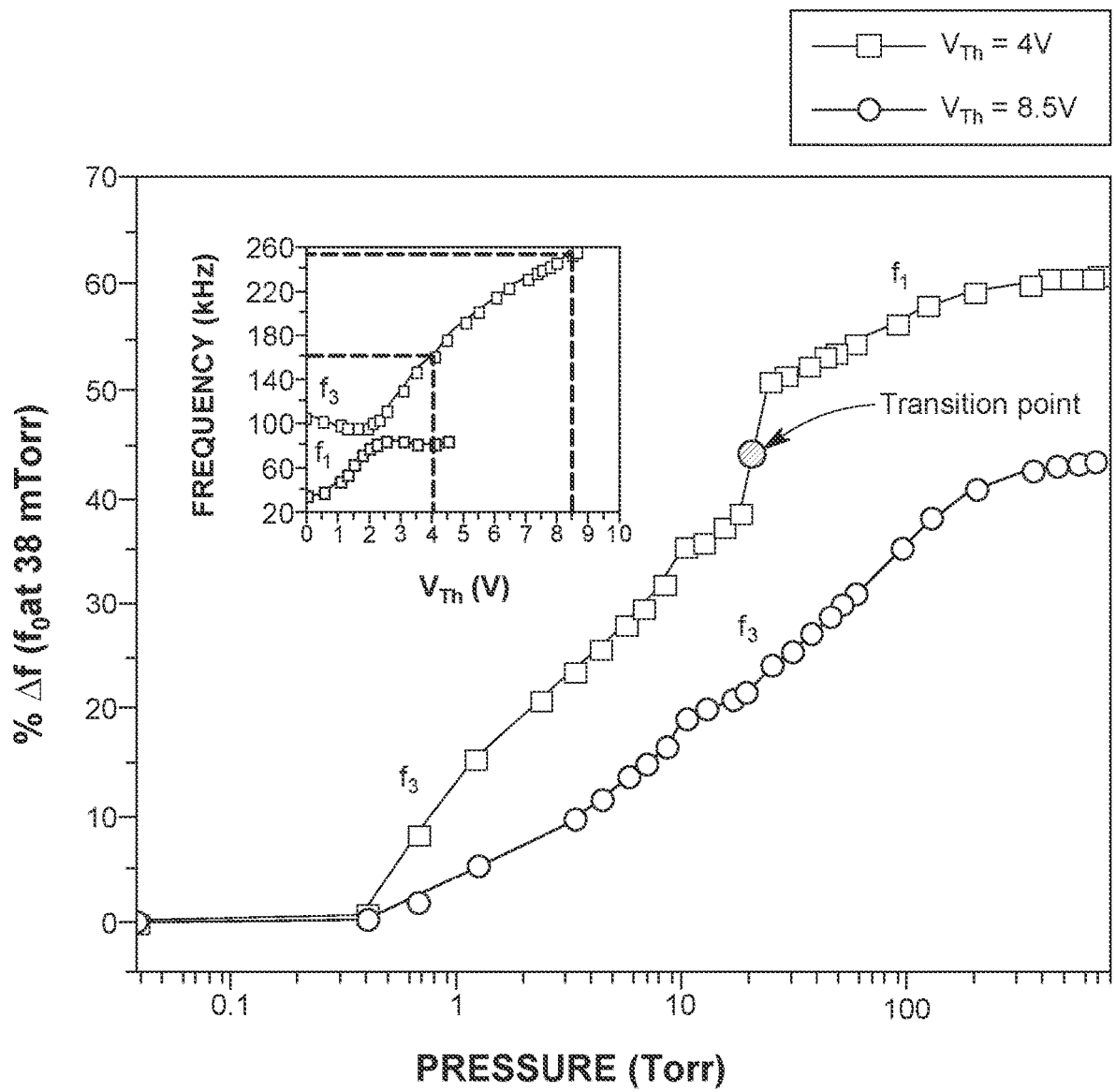
FIG. 8 is a graph illustrating finite element simulations of the percentage relative shift of resonant frequency and the sensitivity with pressure at an electrothermal voltage of 4 V.
Figure 9:
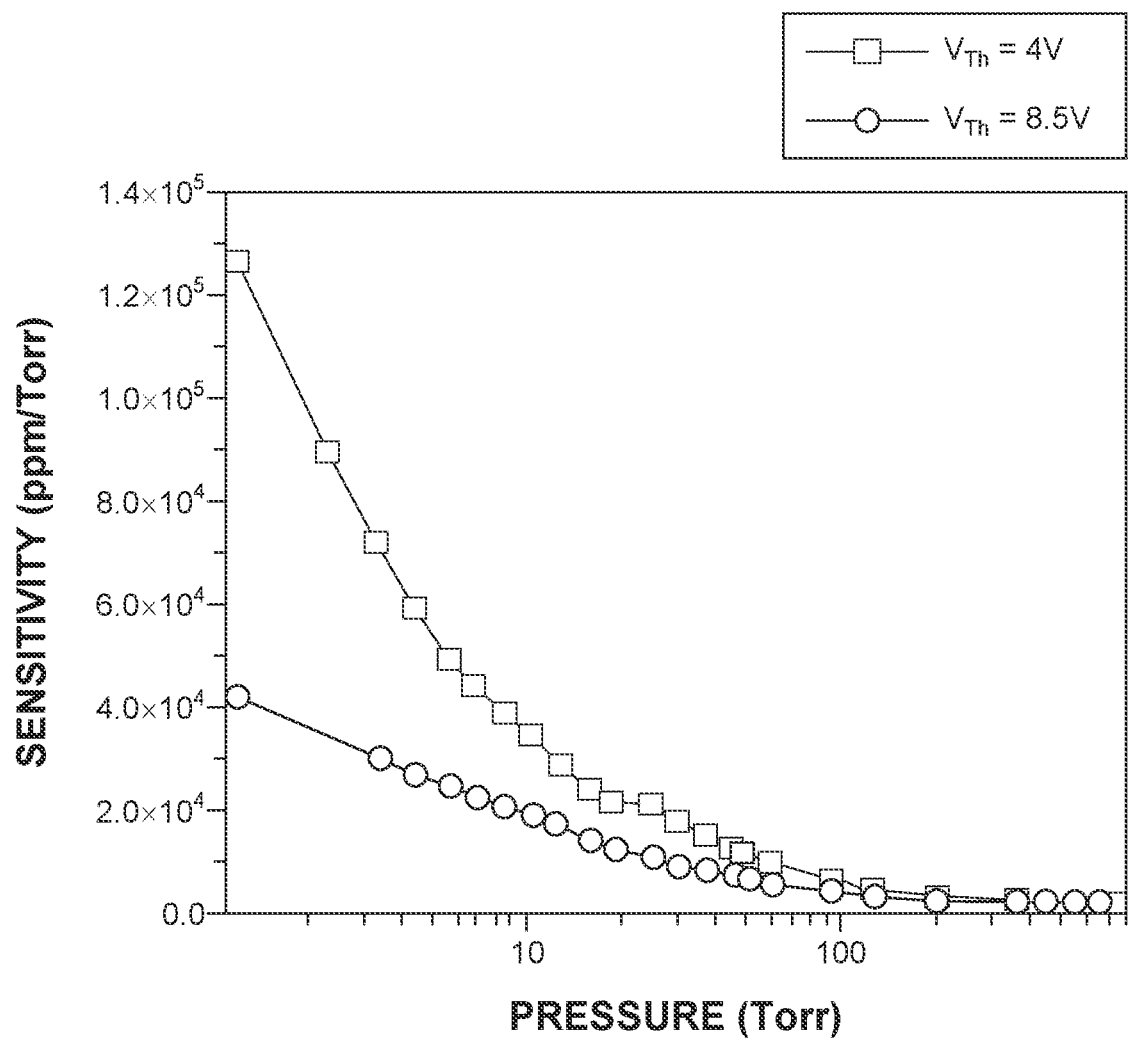
FIG. 9 is a graph illustrating finite element simulations of the percentage relative shift of resonant frequency and the sensitivity with pressure at an electrothermal voltage of 8.5 V.

Performance of the resonant pressure sensor 100 containing the curved microbeam is simulated at two operating voltages, 4 V and 8.5 V. Referring to FIG. 8, the percentage of relative frequency shift as a function of pressure is illustrated. Good agreement exists with the experimental data (see FIG. 7). The mismatch between the experimental and simulation results can be attributed to geometry imperfections. As shown in FIG. 9, the sensitivity decreases with the applied electrothermal voltage, because the curved microbeam is cooled down before reaching the transition point. Thus, the sensitivity is calculated from the third vibration mode. Sensitivity of the resonant pressure sensor at 1.2 Torr and $V_{Th}$=4 V, which is equal to 127,185 ppm/Torr, is three times higher than sensitivity at 8.5 V. Sensitivity is expected to improve with higher applied electrothermal voltage. However, based on the veering phenomenon between the two symmetric modes, a lower voltage actuation shows higher sensitivity while consuming lower power.

Figure 10:
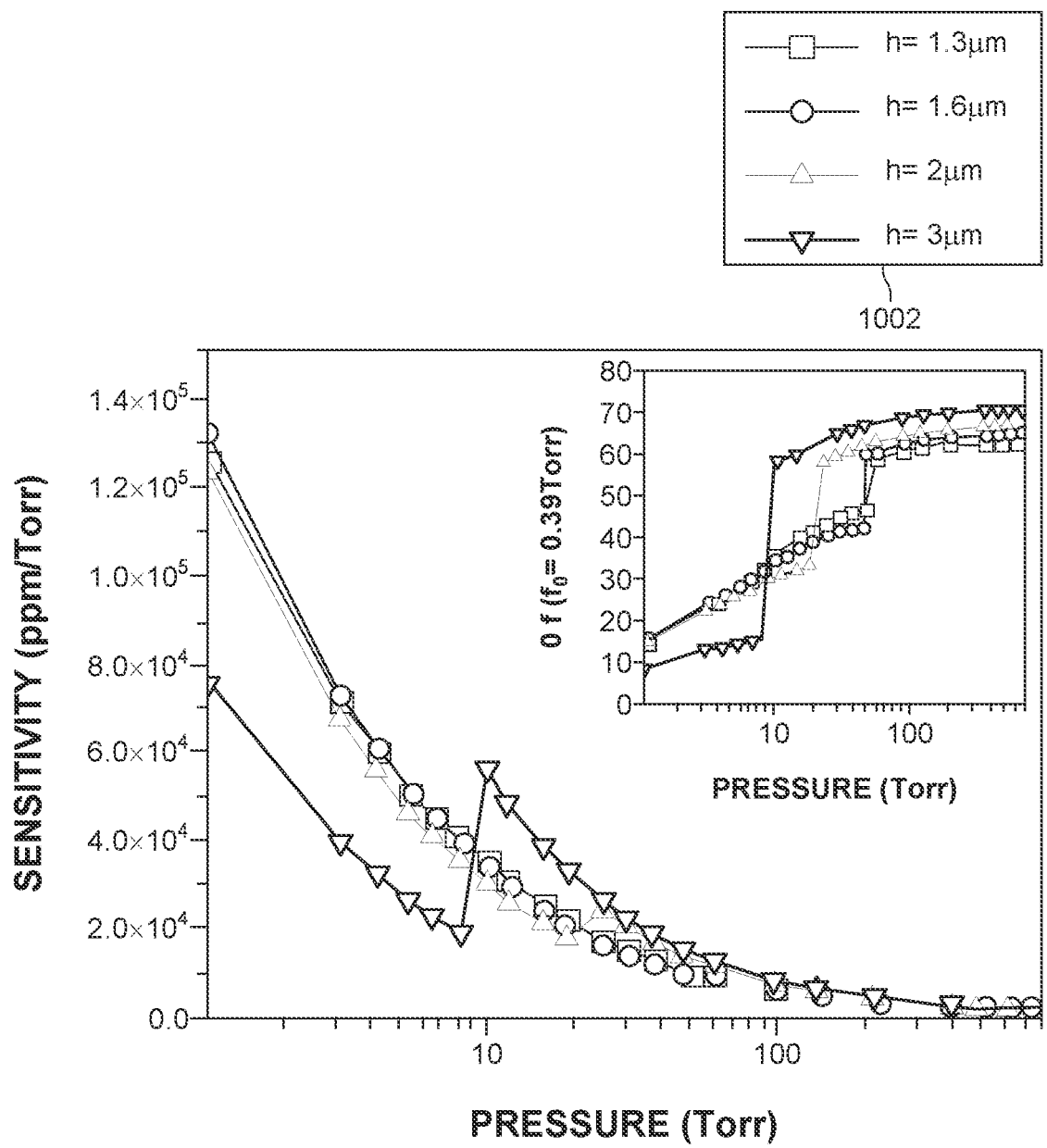
FIG. 10 is a graph illustrating finite element simulations of the sensitivity with pressure an electrothermal voltage of 4 V at different thickness values for the microbeam.

Referring to FIG. 10, to further understand the effect of geometry on the veering phenomenon, and thus sensitivity, the variation of sensitivity with varying pressure for the same curved microbeam but with different thicknesses 1002, h, is illustrated. The transition point decreases with increasing thickness, h. Below the transition point pressure value, sensitivity decreases with increasing h, and above the transition point, sensitivity becomes higher for a thinner microbeam. This suggests an optimum thickness for better sensitivity for low or high pressure depending on the targeted application. In addition, for a specific thickness, the third resonant frequency decreases until getting very close to the first symmetric resonant frequency. This presents a method to choose the geometric parameters of such curved microbeams carefully to activate the veering phenomenon.

Figure 11:
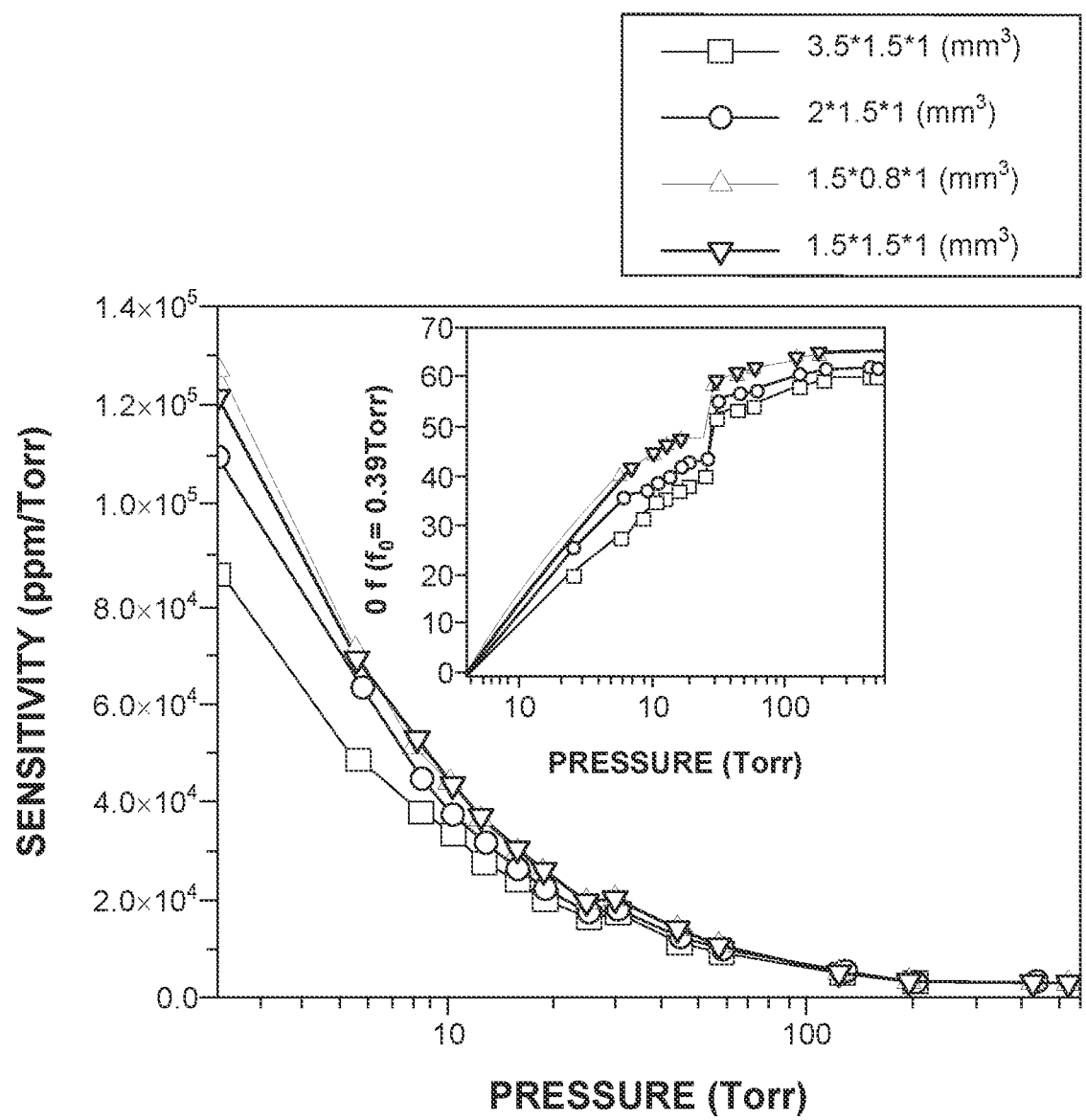
FIG. 11 is a graph illustrating finite element simulations of the sensitivity with pressure an electrothermal voltage of 4 V at different air volume surrounding the micro-beam.

Referring to FIG. 11, an optimal package size for optimal sensitivity is determined. At low pressure, sensitivity is much higher in the smaller volume. Sensitivity of the micro-beam at 2.35 Torr and for small package size of 1.5×1.5×1 mm$^3$, which equals to 125,919 ppm/Torr, is 1.5 times higher compared to the large package size (3.5×1.5×× mm$^3$).

Exemplary embodiments are directed to a wide pressure range and highly sensitive resonant pressure sensor using a curved microbeam. The initially curved microbeam is electrothermally heated and exhibits veering phenomenon between two of its vibration modes, e.g., the first two symmetric vibration modes. The resonant pressure sensor exhibits high sensitivity, 2689 ppm/Torr, in wide pressure range, 38 mTorr to 200 Torr with a pressure limit of 200 Torr and an optimal value of 1446 ppm/Torr. Simulation through FEM illustrates the significant effect of thickness of the micro-beam, vacuum chamber size and thermal actuation load on the sensitivity of the resonant pressure sensor. In one embodiment for pressure sensor applications requiring high sensitivity, these parameters are optimized.

The foregoing written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for sensing pressure, the method comprising:
   electrothermally heating a curved microbeam comprising a plurality of resonant frequencies;
   electrostatically driving the curved microbeam at a first symmetric resonant frequency and a second symmetric resonant frequency selected from the plurality of resonant frequencies;
   monitoring changes in the first symmetric resonant frequency and the second symmetric resonant frequency caused by an ambient pressure surrounding the curved microbeam; and
   using the monitored changes in the first symmetric resonant frequency and the second symmetric resonant frequency to determine the ambient pressure.

2. The method of claim 1, wherein electrothermally heating the curved microbeam comprises passing an electrothermal voltage along a length of the curved microbeam.

3. The method of claim 2, wherein the electrothermal voltage comprises 4 VDC.

4. The method of claim 2, wherein passing the electrothermal voltage comprises selecting the electrothermal voltage to cause a maximum displacement at a midpoint along the length of the curved microbeam of less than 12 μm and a temperature within the curved microbeam below a curved microbeam melting point.

5. The method of claim 1, wherein the first symmetric resonant frequency is associated with a first symmetric vibration mode and the second symmetric resonant frequency is associated with a second symmetric vibration mode.

6. The method of claim 5, wherein the first symmetric vibration mode comprises a fundamental vibration mode and the second symmetric vibration mode comprises a third vibration mode.

7. The method of claim 1, wherein electrostatically driving the curved microbeam comprises using an AC power source in communication with the curved microbeam and an actuating electrode to deliver an AC signal to the curved microbeam, the actuating electrode extending along a length of the curved microbeam and spaced from the curved microbeam.

8. The method of claim 7, wherein the method further comprises:
   spacing the actuating electrode from the curved microbeam by a distance of at least 12 μm.

9. The method of claim 1, wherein the step of monitoring changes in the first symmetric resonant frequency and the second symmetric resonant frequency comprises:
   monitoring changes in the second symmetric resonant frequency when increases in the ambient pressure cause decreases in the second symmetric resonant frequency; and
   monitoring changes in the first symmetric resonant frequency when increases in the ambient pressure cause increases in the second symmetric resonant frequency.

10. The method of claim 1, wherein the method further comprises:
    selecting the curved microbeam to have dimensions and an initial rise at a midpoint along a length of the curved microbeam that produce strong veering between a plot of changes in the first symmetric resonant frequency with ambient pressure and changes in the second symmetric resonant frequency with ambient pressure.

11. The method of claim 10, wherein the step of selecting the curved microbeam comprises:
    selecting a curved microbeam wherein the length is 800 μm, the initial rise at the midpoint along the length is 2.6 μm, a width perpendicular to the length is 25 μm and a thickness perpendicular to the length and parallel to the initial rise is 1.5 μm.

12. A resonant pressure sensor comprising:
    a curved microbeam comprising a pair of opposing ends, a length extending between the pair of opposing ends, and a plurality of resonant frequencies;
    an actuating electrode extending along the length of the curved microbeam and spaced from the curved microbeam;
    an AC power source in communication with one of the opposing ends and the actuating electrode to deliver an AC signal at a first symmetric resonant frequency and a second symmetric resonant frequency selected from the plurality of resonant frequencies to the curved microbeam;
    a DC power source in communication with the opposing ends to pass an electrothermal voltage along a length of the curved microbeam; and
    a frequency monitoring device to monitor changes in the first symmetric resonant frequency and the second symmetric resonant frequency caused by an ambient pressure surrounding the curved microbeam.

13. The resonant pressure sensor of claim 12, wherein the curved microbeam comprises dimensions and an initial rise from the opposing ends at a midpoint along the length of the curved microbeam that produce strong veering between a plot of changes in the first symmetric resonant frequency with ambient pressure and changes in the second symmetric resonant frequency with the ambient pressure.

14. The resonant pressure sensor of claim 13, wherein the length is 800 μm, the initial rise at the midpoint along the length is 2.6 μm, and the curved microbeam comprises a width perpendicular to the length of 25 μm and a thickness perpendicular to the length and parallel to the initial rise of 1.5 μm.

15. The resonant pressure sensor of claim 12, wherein the actuating electrode is spaced from the curved microbeam by a distance of at least 12 μm at the opposing ends of the curved microbeam.

16. The resonant pressure sensor of claim 12, wherein the first symmetric resonant frequency is associated with a first symmetric vibration mode and the second symmetric resonant frequency is associated with a second symmetric vibration mode.

17. The resonant pressure sensor of claim 16, wherein the first symmetric vibration mode comprises a fundamental vibration mode and the second symmetric vibration mode comprises a third vibration mode.

18. The resonant pressure sensor of claim 12, the electrothermal voltage comprises 4 VDC.

19. The resonant pressure sensor of claim 12, wherein the electrothermal voltage causes a maximum displacement at a midpoint along the length of the curved microbeam between the opposing ends of less than 12 μm and a temperature within the curved microbeam below a curved microbeam melting point.

20. The resonant pressure sensor of claim 12, wherein the frequency monitoring device comprises a laser Doppler vibrometer.

* * * * *